Jan. 7, 1947. E. B. MALLORY 2,413,838
WASTE PURIFICATION APPARATUS HAVING SUPERPOSED
AERATING AND CLARIFYING CHAMBERS
Filed Aug. 2, 1940 3 Sheets-Sheet 3
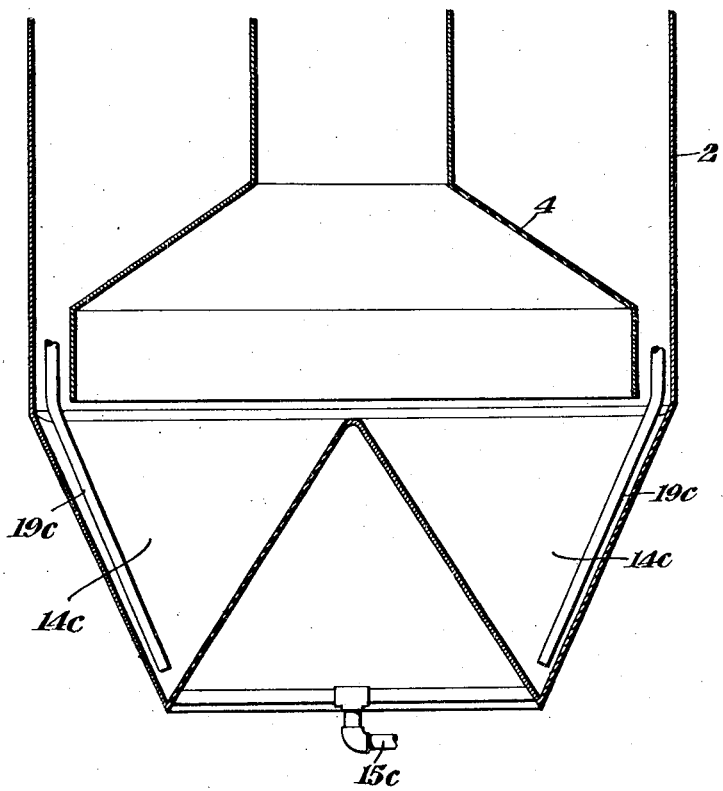
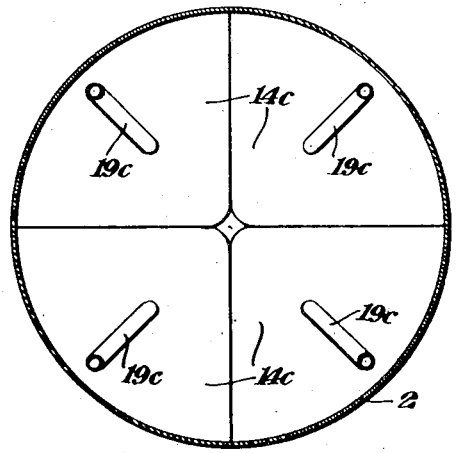
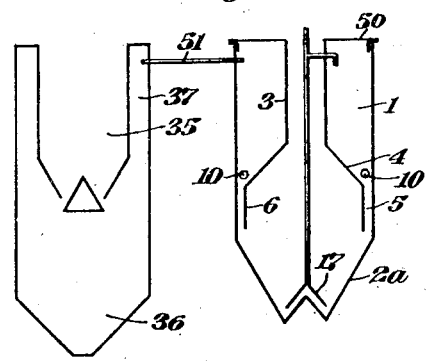
INVENTOR
Edward B. Mallory
BY
Ward Crosby & Neal
ATTORNEYS Patented Jan. 7, 1947

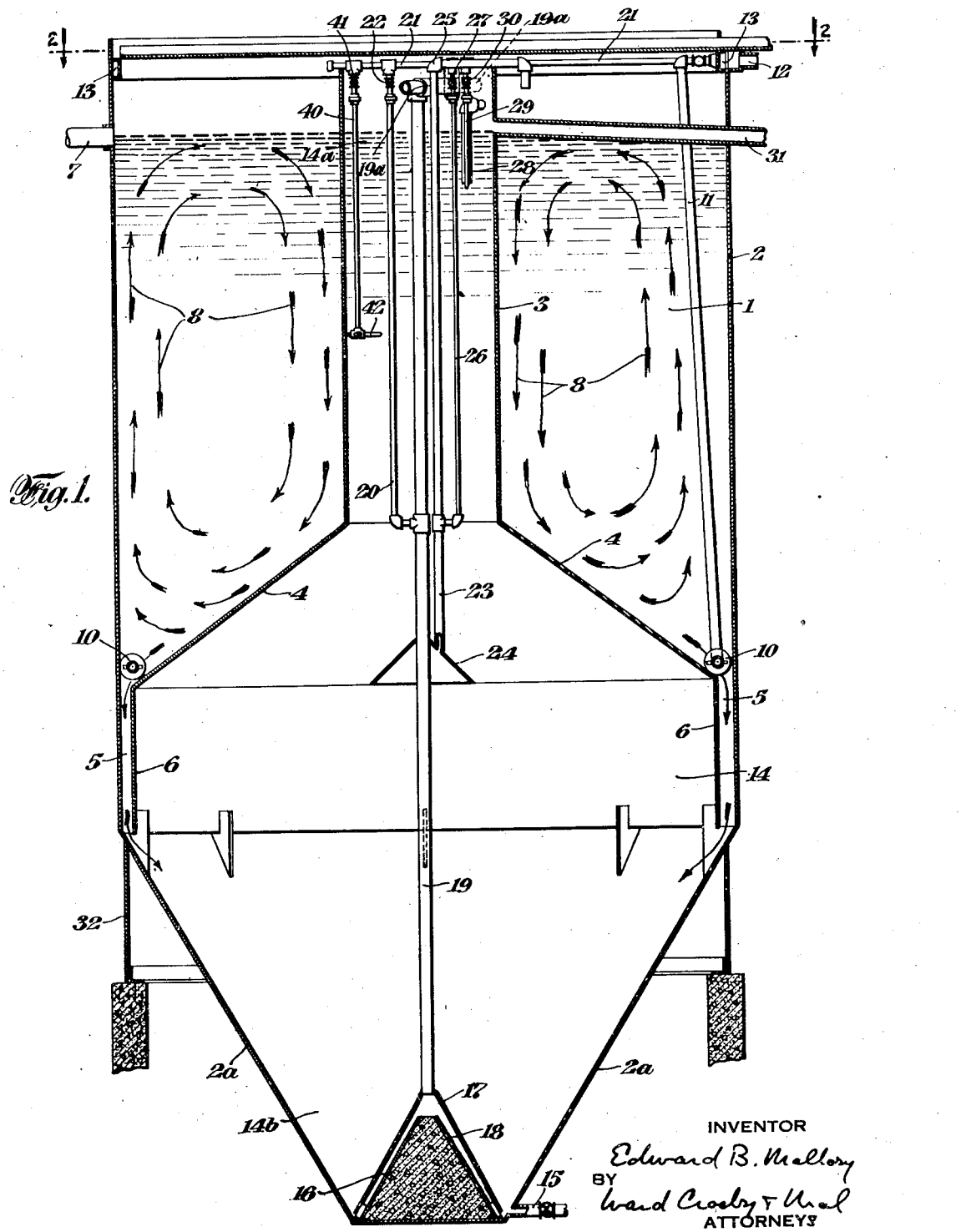

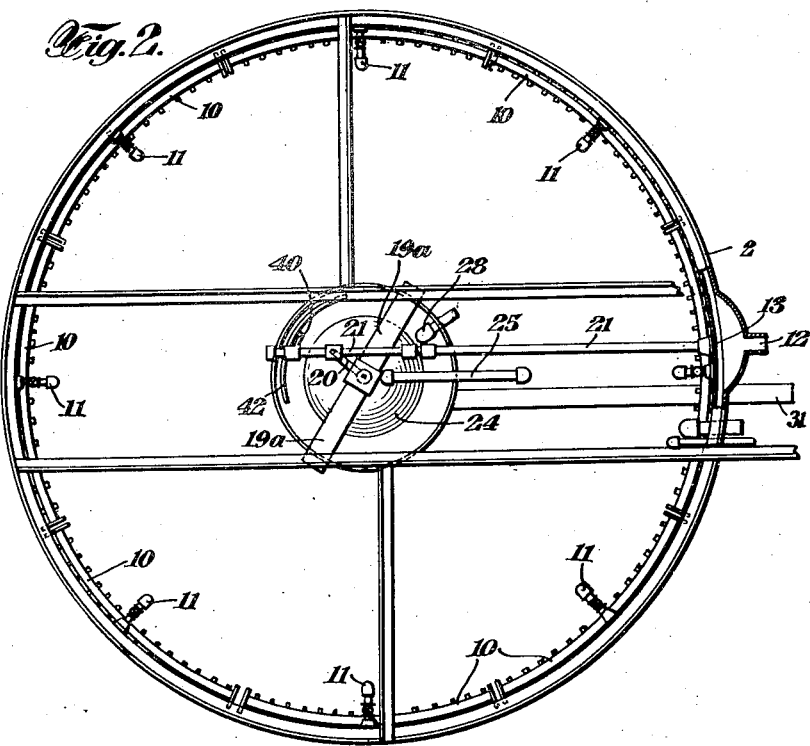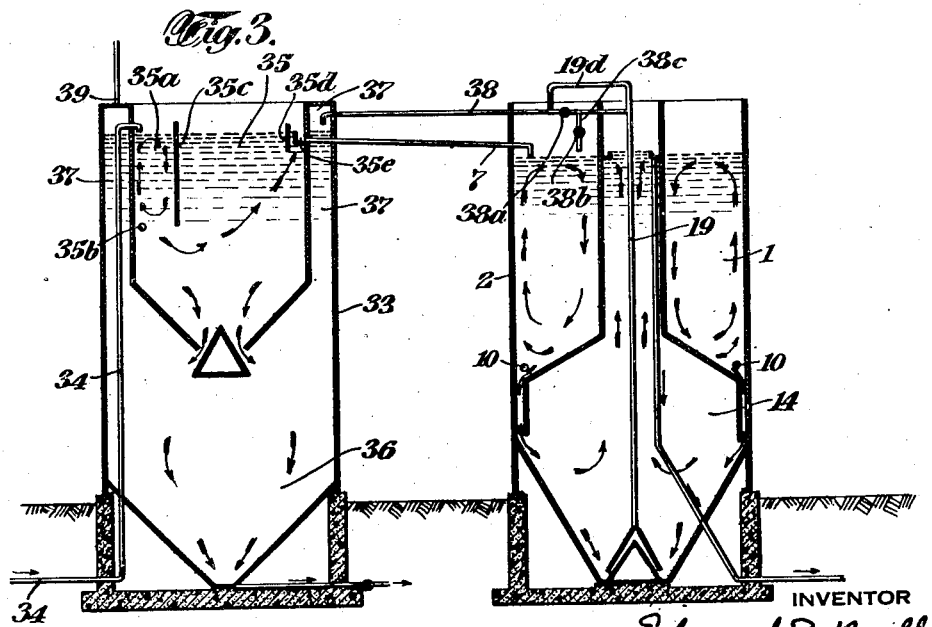

2,413,838

UNITED STATES PATENT OFFICE 2,413,838

WASTE PURIFICATION APPARATUS HAVING SUPERPOSED AERATING AND CLARIFYING CHAMBERS

Edward B. Mallory, Tenafly, N. J.

Application August 2, 1940, Serial No. 350,019

9 Claims. (Cl. 210—8)

The invention in one of its aspects relates to waste purification apparatus of the type wherein, after appropriate primary treatment if needed, the waste liquors to be treated are passed thru an aerator and into a clarifier or settling chamber in which latter the impurities settle out at the bottom in the form of a sludge, and clarified effluent is drawn off at the top. In this aspect the invention aims primarily to provide aerator-clarifier apparatus of the above character, of augmented efficiency and economy, both from the standpoint of performance and from the standpoint that the aerator and clarifier are coordinated into a compact and portable unit which may be readily fabricated by the manufacturer and transported and erected in the field. Apparatus of the above character is particularly advantageous for installations of relatively small capacity, such as may be used in the treatment of milk waste, industrial wastes, or wastes obtained from small communities, hotels and the like.

In another aspect the invention relates to primary treatment apparatus and methods as used in conjunction with purification operations of the above character, with particular respect to the dependable and economical disposal of the sludges formed by the precipitation of the suspended solids matter in the raw wastes. In addition, provision is made for the safe and unobjectionable disposal of explosive and noxious gases which are emitted during digestion of the sludge solids.

In another aspect the invention deals with the provision of aeration in the upper purified liquid zone of the clarifier, for the purpose of adding oxygen to the clarifier effluent, without producing eddy currents which would cause admixture with the purified effluent of sludge particles contained at lower levels in the clarifier. This feature of the invention becomes feasible where a clarifier is used having a clarified liquid containing zone which is of relatively restricted cross-sectional area as compared to the underlying zones in the clarifier, as hereinafter referred to.

In another aspect, the invention relates to recirculation steps aimed to avoid stagnation during periods when the apparatus is idle or operating at very low loads.

Further objects and advantages of the invention will be in part obvious and in part specifically referred to in the description hereinafter contained which, taken in conjunction with the accompanying drawings, discloses certain preferred forms of apparatus constructed to operate in accordance with the invention. From the standpoint of the invention in its broader aspects, such apparatus should be regarded as only illustrative of the principles of the invention. In the drawings—

Fig. 1 is a central vertical section taken thru an aerator-clarifier apparatus constructed to operate in accordance with the invention.

Fig. 2 is a horizontal section thru such apparatus taken on line 2—2 of Fig. 1, looking in the direction of the arrows.

Fig. 3 is a vertical sectional view, somewhat schematic, showing primary treatment apparatus associated with an aerator-clarifier of the type illustrated in Figs. 1 and 2.

Figs. 4 and 5 are respectively horizontal and vertical sections showing a clarifier having sludge receiving zones of modified construction.

Fig. 6 is a view similar in general character to Fig. 3, but showing a somewhat modified construction.

In accordance with the present invention, I employ an aerator chamber which is of general annular form and in conjunction with which air diffusing devices are used which set up in the aerator a vortex action of what may be termed a torus-like form. Aeration of this character I have found to act with greatly increased efficiency upon the mixed liquor contained within the aerator, as compared to the action of the so-called "spiral flow" aerators which heretofore have been widely used, and largely eliminating so-called core losses inherent therein. The aerator chamber is in general superimposed upon a clarifier chamber in such manner that a single enclosing wall and a single separating wall may serve for both, and in such manner that the aerator-clarifier apparatus as a whole may be readily fabricated, transported and assembled. Preferably the tubular space surrounded by the aerator chamber is utilized as an upper zone of the clarifier containing purified liquid from which the purified effluent is taken off, and thru which the clarifier chamber may be entered for inspection or repair.

Referring particularly to the specific embodiment of the invention which is shown in Figs. 1 and 2, the annular aerating chamber 1 is shown as defined by an outer wall 2 which will usually be cylindrical in form and of fabricated plate steel, and an inner cylindrical wall 3. As shown the bottom wall 4 of the aerating chamber 1 preferably slopes downwardly and outwardly to an annular peripheral discharge passageway 5 which is formed between the enclosing wall 2 and a cylindrical apron 6 extending downwardly from the periphery of the aerator bottom wall 4. Incoming waste liquids to be treated pass into the aerator thru a suitable intake conduit 7.

A certain amount of sludge (obtained from the clarifier as hereinafter described) usually will be circulated back into the aerator chamber 1 to mix with the incoming waste liquids, and form so-called mixed liquor to be aerated. The torus-like vortical action above referred to is indicated in general by the arrows 8 appearng on Fig. 1, and in order to produce this action, I provide air diffusing devices 10 which are located in the lower portion of aerating chamber 1 and are preferably of annular form and positioned at the periphery of chamber 1, slightly above the discharge opening 5 thereof. As shown more in detail in Fig. 2, these air diffusers 10 may take the form of a series of arcuate diffuser pipes placed end to end to form a circle, and each served by an air pipe 11 which extends downwardly from above the chamber 1. As shown, a compressed air supply pipe 12 is connected to an annular air supply conduit 13 mounted on top of the outer side wall 2, and the several air supply pipes 11 are connected to this conduit 13.

Thus the air bubbles rising from the diffuser pipes 10 form an annular column passing upwardly along the inside of the side wall 2, causing the mixed liquor to circulate as indicated by the arrows 8 in vortex-like manner. Aerated and thoroughly mixed liquor is displaced by incoming raw waste and the sludge returned from the clarifier, the aerated mixed liquor then passing downwardly through the annular space between the clarifier apron and the exterior wall into the clarifier.

In this way the gradual discharge from the aerator of the aerated mixed liquor may be effected, and efficient agitation and aeration of the contents of the aerator secured, without the need of mechanical agitating or removal-assisting devices. As compared to the action of the so-called "spiral flow" aerators, the mixed liquor in the aerator as above described follows a torus-like vortical path, instead of passing spirally from one end of an elongated aerator to the other, and I have found that an aerator of the present type, operating with wastes of low concentration, will operate efficiently with four or five cubic feet of volumetric holding capacity per pound of B. O. D. per day to be treated, and even when handling wastes of extremely high concentration running in excess of 2,000 to 3,000 P. P. M. B. O. D., a ratio of 10 cubic feet per pound of B. O. D. per day has been found to be adequate. The spiral flow aerators as heretofore used have required a capacity ranging from 25 to 60 cubic feet per pound of B. O. D. to be treated per day.

The aerated mixed liquor passes downwardly thru the discharge opening 5 into the clarifier chamber 14, preferably at an intermediate level therein, and as above referred to the clarifier chamber preferably has an upper clarified liquid containing zone 14a surrounded by the aerating chamber 1. The sloping bottom wall 4 of the aerator may thus serve as a top wall for the intermediate zone of clarifying chamber 14, the clarified liquid tending to pass upwardly along wall 4 to the upper zone 14a and thus preventing the clarified liquid from being trapped in dead spots in the clarifier. The inner wall 3 of aerating chamber 1 may serve as the enclosing wall for the upper zone 14a of the clarifier.

The mixed liquor passes into clarifying chamber 14 thru opening 5 at an intermediate level as above described, whereupon the contained solids gradually precipitate out to form a sludge blanket in the bottom zone 14b of the clarifier, this zone being preferably provided with an enclosing wall 2a which converges inwardly and downwardly as shown in Fig. 1, so that the sludge moves down by gravity without the need of mechanical collecting devices, to a central point at the bottom of the clarifier, from which sludge may be removed as required thru an off-take pipe 15.

As shown, the clarifier is provided with a conical bottom wall 16, having a conical member 17 mounted above and in spaced relation thereto, to provide a return passageway 18 thru which a certain amount of sludge as precipitated in the clarifier chamber may be returned to the aerating chamber, and as a feature of the invention in one of its specific aspects, I provide an air-lift device for so recirculating sludge. As shown, a sludge recirculation pipe 19 communicates with passageway 18 and extends upwardly thru the central portion of the clarifier chamber, having a T 19a at the top which delivers into aerating chamber 1. An air supply pipe 20 communicates at its lower end with pipe 19, and at its upper end with a branch pipe 21 connected to the air supply conduit 13. By the regulation of a valve 22 (Fig. 1) in pipe 20 the amount of sludge recirculated back into the aerating chamber 1 by air-lift action, may be increased or decreased as desired, the sludge passing upwardly from passageway 18 through pipe 19 and being discharged through the T 19a into the aerating chamber 1. From a broader aspect of the invention, the above particular mechanism for recirculating sludge, is not essential.

To adapt the principles herein disclosed to tanks of relatively large diameter and avoid excess tank heights, I may provide as shown in Figs. 4 and 5, a multiplicity of hopper-like sludge blanket receiving zones 14c in the bottom of the clarifier chamber, each being provided with a sludge recirculating pipe 19c similar to pipe 19 above described. Sludge may be drawn off thru off-take pipe 15c.

I also preferably provide for recirculation back into the aerator when desired of the contents of the clarifier which are normally in zones above the sludge blanket above referred to. As shown in Fig. 1, a recirculation pipe 23 communicates with the interior of clarifier chamber 14 at an intermediate level, passing through a conical collector 24 at its lower end, and having an elbow 25 at its upper end which delivers into the aerating chamber 1. An air supply pipe 26 communicates at its lower end with pipe 23, and is connected at its upper end to the branch air supply pipe 21 above described. A valve 27 in pipe 26 enables the air supply to be cut off or regulated as desired to recirculate from an intermediate level of clarified chamber 14 back into the aerator, by the resulting air-lift effect. Recirculation from the upper clarified liquid containing zone 14a to the aerator may also be afforded. As shown in Fig. 1, a recirculation pipe 28 communicates at its lower end with zone 14a of the clarifier and at its upper end with aerating chamber 1, an air supply pipe 29 and valve 30 similar to the parts 26 and 27 above described being provided for pipe 28. Particularly in the case of small installations in which only intermittent operation is needed so that the plant in effect lies idle in the meantime, recirculation of the clarifier contents as above described, from an upper level or levels as well as from the bottom of the sludge blanket in the clarifier, may be utilized to insure that the contents of the clarifier do not become stagnant and septic. Also this recirculation may be used when due to overloading or mal-operation, the sludge blanket in the clarifier rises to a level at which it might shortly pass out with the effluent and pollute the latter. Under these circumstances the rate of recirculation caused by the airlift effect can be accelerated so as to recirculate sludge from the top of the sludge blanket back into the aerator chamber 1, for more complete treatment. Recirculation from the clarified liquid zone 14a or an intermediate zone in the clarifier may also be utilized whenever desired to obtain a higher degree of purification in the effluent. As shown, the effluent passes out thru an offtake pipe 31 communicating with zone 14a of the clarifier and passing out thru the side walls 3 and 2.

As a preferable feature of the invention in one of its aspects, I provide for aeration of the upper purified liquid containing zone 14a of the clarifier. As shown, an air pipe 40 (Fig. 1) having a regulating valve 41 is connected at its upper end to the pipe 21 above described, and at its lower end to an air diffuser pipe 42 located part way down in zone 14a. Mixed liquor as discharged from the aeration chamber is, under normal operating conditions, heavily charged with dissolved oxygen. During the period of detention in the various zones of the clarifier, however, the relatively high oxygen-consuming demand of the sludge settling out of the mixed liquor in the clarifier greatly depletes this supply of oxygen. Aeration of the liquid in the upper zone of the clarifier, as above described, restores the supply of oxygen in the clarified liquid, substantially improving the character of the clarifier effluent by accelerating the chemical reactions in a subsequent treatment stage where such is used, or by delivering a highly oxygenated liquid to the receiving waters of the region, when the clarifier effluent passes thereto without further treatment. The maximum amount of dissolved oxygen possible is desirable in this clarifier effluent to accommodate the small, but definite, oxygen demand generally occurring therein even under the best conditions.

In conventional types of clarifiers, having relatively uniform and large cross sectional areas above the sludge holding zones, aeration of the upper clarified liquid containing zone of the clarifier would set up eddy currents in the clarifier extending down into the lower sludge containing zones thereof, with consequent admixture of sludge particles, consisting of suspended matter very slightly heavier than water, with the clarifier liquid in the upper zone, thereby greatly depreciating the effluent and increasing the oxygen demand thereof because of the admixture of sludge solids, which represent a relatively great oxygen demand. By the employment of an upper clarified liquid zone of relatively small cross sectional area as compared with the underlying zone of the clarifier, it is possible to aerate the clarified liquid without causing eddy currents whose influence will project downwardly far enough to disturb the sludge blanket and cause admixture thereof with the clarified liquid.

An aerator-clarifier apparatus of the above character may be readily fabricated and assembled at the manufacturing plant, using steel plate for all of the main and partition walls, and requiring no moving parts which need special adjustment or attention during installation or operation. The construction as a whole is compact and capable of ready shipment and installation, the illustrated form being shown as provided with a circular base 32 extending downwardly from side wall 2 to rest upon the foundation, so that setting of the apparatus upon its foundation and connecting up the supply and delivery pipes thereto is all that is needed to place it in operation. Such apparatus is also advantageous in larger installations.

In instances where wastes are being treated which require no preliminary settling, the aerator-clarifier above described may serve as the first stage, or as the only stage of purification, according to requirements. In Fig. 3 I have shown diagrammatically such an aerator-clarifier used in conjunction with a primary treatment tank 33 into which raw waste is fed thru an intake conduit 34 which delivers into a primary settling chamber 35, from the bottom of which settled solids may pass into a digestion chamber 36. The chambers 35 and 36 of Fig. 3, and their relation to each other, may be as previously known, except that I have shown a preliminary degreasing chamber 35a, acted upon by an air diffuser 35b as shown, and separated from chamber 35 by a baffle 35c. A scum baffle 35d is also shown for the launder 35e, to which the intake conduit 7 for the aerator is connected. The explosive and noxious gases generated in chamber 36 are collected in a closed compartment or annular chamber 37 at the top of the tank 33, instead of permitting these gases to escape freely as has heretofore been customary, and spent air from the air lift pipe 19 used in the aerator-clarifier as above described, is fed from the upper part of the aerator-clarifier thru a pipe 38 which leads into closed chamber 37 above described, and thus dilutes the explosive gases contained therein to a point which renders them harmless as well as substantially non-odorous.

As shown in Fig. 3, the sludge is carried up by the air lift pipe 19, to an elbow 19d which connects with pipe 38. When a valve 38a in pipe 38 is closed (valve 38a hereinafter mentioned being also closed), sludge from the clarifier passes over into chamber 36 for disposal with the primary sludge contained in the latter. When valve 38a is closed, and a valve 38b in a branch pipe 38c is open, sludge is recirculated from the clarifier back into aerator 1, the spent air from pipe 19 passing over into closed chamber 37 thru pipes 19d and 38. By adjusting valves 38a and 38b, the relative amounts of sludge delivered to aerator 1 and chamber 36 may be adjusted as desired.

In the treatment of specific wastes as for example, separator beer produced in the manufacture of yeast, and in the treatment of overloads of specific wastes as for example, milk wastes produced in diary product plants, noxious odors may be developed in the oxidation of the wastes in the areation compartment and arise therefrom. Many of these specific wastes arise in locations where noxious odors in the vicinity are objectionable. As shown in Fig. 6, I may close the entire top of the aeration chamber 1 with a cover 50 to entrap the air and gases arising from the mixed liquor, and conduct this air thru a suitable conduit 51 for discharge into the annular compartment 37 of a primary tank as described, as a substitute for or in addition to the steps above described in connection with Fig. 3, and thence to a remote point, or to a suitable de-odorizing chamber, or in the absence of a primary tank of the type described, the air and gases collected at the top of the areator 1 may be conducted to any suitable available point for treatment or disposal.

While the invention has been disclosed as carried out by the above described specific forms of apparatus, it will be understood that from the standpoint of the invention in its broader aspects, many changes may be made therein, without departing from the invention within the scope of the appended claims.

I claim:

1. Aerator-clarifier apparatus of the class described, including an aerator chamber of substantially annular form and having its bottom wall sloping downwardly to a peripheral discharge passageway, a clarifier chamber having a lower sludge receiving zone underlying said areator chamber, said clarifier chamber having an upper clarified liquid containing zone of relatively restricted cross sectional area and enclosed by said aerating chamber, said clarifier chamber communicating at an intermediate level with the above mentioned discharge passageway and having a top wall sloping upwardly from said passageway to the above mentioned upper clarified liquid containing zone of the clarifier chamber, and air diffusing means constructed and arranged to produce a torus-like vortical circulation of the contents of said aerator chamber.

2. Aerator-clarifier apparatus of the class described, including an aerator chamber of substantially annular form and having its bottom wall sloping downwardly to a peripheral discharge passageway, a clarifier chamber having a lower sludge receiving zone underlying said aerator chamber, said clarifier chamber having an upper clarified liquid containing zone of relatively restricted cross sectional area and enclosed by said aerating chamber, said clarifier chamber communicating at an intermediate level with the above mentioned discharge passageway and having a top wall sloping upwardly from said passageway to the above mentioned upper clarified liquid containing zone of the clarifier chamber, and air diffusing means constructed and arranged to produce a torus-like vortical circulation of the contents of said aerator chamber, said air diffusing means including diffuser members substantially annularly arranged and located in the lower zone of said aerator chamber near said discharge passageway.

3. Aerator-clarifier apparatus of the class described, including a clarifier chamber provided with a substantially central upper clarified liquid containing zone, an annular aerating chamber surrounding said last mentioned upper zone of the clarifier chamber, said clarifier chamber having a lower sludge receiving zone beneath said aerator chamber, said aerator chamber having a discharge passageway communicating with the clarifier chamber at an intermediate level of said clarifier chamber, and air diffusion means constructed and arranged to produce a torus-like vortical circulation of the contents of said areator chamber.

4. Aerator-clarifier apparatus of the class described, including a clarifier chamber provided with a substantially central upper clarified liquid containing zone, an annular aerating chamber surrounding said last mentioned upper zone of the clarifier chamber, said clarifier chamber having a lower sludge-receiving zone beneath said areator chamber, said aerator chamber having a substantially annular and peripherally disposed discharge passageway located near the bottom of the aerator chamber, and air diffusing members substantially annularly arranged and located in the lower portion of said aerator chamber near said discharge passageway, said air diffusing members being constructed and arranged to produce a torus-like vortical circulation of the contents of said aerator chamber.

5. Waste purification apparatus of the class described including an aerator chamber having an enclosing side wall and a discharge opening near its bottom wall which is disposed substantially concentrically with respect to said side wall, an air diffusing means including diffuser members substantially annularly arranged concentrically with said side wall and also operating in the lower zone of said aerator chamber, said diffuser members being constructed and arranged to produce a torus-like vortical circulation of the contents of said aerator chamber.

6. Waste purification apparatus of the class described including an aerator chamber of substantially annular form and having a peripherally located discharge passageway near its bottom, and air diffusing means including substantially annularly arranged diffuser members operating near the periphery of said annular chamber and located in the lower zone thereof near said discharge passageway, said diffuser members being constructed and arranged to produce a torus-like vortical circulation of the contents of said aerator chamber.

7. Waste purification apparatus of the class described including an aerator chamber of substantially annular form and having a discharge passageway near its bottom which is disposed substantially concentrically with respect to said chamber, an air diffusing means including diffuser members substantially annularly arranged and operating in the lower zone of said aerator chamber, said diffuser members being disposed substantially concentrically with respect to said aerator chamber at a higher level than said discharge passageway and being constructed and arranged to produce a torus-like vortical circulation of the contents of said chamber.

8. Waste purification apparatus including a clarifier chamber, and means for feeding aerated mixed liquor thereto, said chamber having an upper purified effluent zone with an effluent offtake conduit leading therefrom and a lower sludge blanket containing zone, and means for injecting oxygen containing gas into the aforesaid purified effluent zone, said last mentioned means operating above the level of said sludge blanket receiving zone.

9. Waste purification apparatus including a clarifier chamber and means for feeding aerated mixed liquor thereto, said chamber having an upper purified effluent zone with an effluent offtake conduit leading therefrom and a lower sludge blanket containing zone, said purified effluent zone being a relatively restricted cross-sectional area as compared to a lower zone of said clarifier, and means for injecting oxygen containing gas into the aforesaid purified effluent zone, said last mentioned means operating above the level of said sludge blanket receiving zone.

EDWARD B. MALLORY.